(12) United States Patent
Socransky

(10) Patent No.: US 11,936,106 B2
(45) Date of Patent: *Mar. 19, 2024

(54) SYSTEM AND METHOD FOR INFUSING NANO-TECHNOLOGY INTO PRODUCTION OF PHYSICAL STORAGE CONTAINERS

(71) Applicant: Alexander Socransky, Los Angeles, CA (US)

(72) Inventor: Alexander Socransky, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,427

(22) Filed: Apr. 20, 2023

(65) Prior Publication Data

US 2023/0282986 A1 Sep. 7, 2023

Related U.S. Application Data

(60) Continuation-in-part of application No. 17/572,061, filed on Jan. 10, 2022, now Pat. No. 11,848,495,
(Continued)

(51) Int. Cl.
*H01Q 15/14* (2006.01)
*B29B 7/90* (2006.01)
(Continued)

(52) U.S. Cl.
CPC ............ *H01Q 15/141* (2013.01); *B29B 7/90* (2013.01); *B29C 41/003* (2013.01); *B29C 41/08* (2013.01); *B29C 41/12* (2013.01); *B29D 11/0074* (2013.01); *C08J 3/203* (2013.01); *C08K 3/04* (2013.01); *C08K 3/041* (2017.05); *C08K 3/046* (2017.05); *C08K 7/06* (2013.01);
(Continued)

(58) Field of Classification Search
CPC ........ H01Q 15/141; H01Q 15/16; B29B 7/90; B29D 11/0074; C08K 3/04; C08K 3/041; C08K 3/046; C08K 7/06; C08K 2201/001; C08K 2201/011; C08K 2201/014; B29K 2105/167; B29K 2507/04; B29L 2011/0083; B29L 2031/3067; B29L 2031/3076; B29L 2031/3097; C08J 3/203
See application file for complete search history.

(56) References Cited

U.S. PATENT DOCUMENTS 11,600,929 B2 * 3/2023 Socransky ........... H01Q 15/141

* cited by examiner

*Primary Examiner* — Francisco W Tschen
*Assistant Examiner* — Elisa H Vera
(74) *Attorney, Agent, or Firm* — Olivo IP Law Group, P.C.; John W. Olivo, Jr.

(57) ABSTRACT

The present invention is directed to the production of shipping containers, computer server farm containers, and other forms of physical storage containers from a carbon nanotube-based fiber material with the potential application of other, non-carbon, nano-based materials containing various structures. Current materials used for shipping containers, computer server farm containers, and other forms of physical storage containers are heavier than the present invention and lack the ability to withstand high-intensity shock vibrations and other disturbances and are vulnerable to radiofrequency ("RF") radiation. Instead of using metal, which is the currently preferred material used in the development of shipping containers, computer server farm containers, and other forms of physical storage containers, the present invention provides the use of a carbon nanotube-based material.

30 Claims, 2 Drawing Sheets

Related U.S. Application Data which is a continuation of application No. 17/180,476, filed on Feb. 19, 2021, now Pat. No. 11,258,183, which is a division of application No. 16/588,668, filed on Sep. 30, 2019, now Pat. No. 11,600,929.

(51) Int. Cl.

| | |
|---|---|
| *B29C 41/00* | (2006.01) |
| *B29C 41/08* | (2006.01) |
| *B29C 41/12* | (2006.01) |
| *B29D 11/00* | (2006.01) |
| *B29K 105/16* | (2006.01) |
| *B29K 507/04* | (2006.01) |
| *B29L 11/00* | (2006.01) |
| *B29L 31/30* | (2006.01) |
| *C08J 3/20* | (2006.01) |
| *C08K 3/04* | (2006.01) |
| *C08K 7/06* | (2006.01) |
| *H01Q 15/16* | (2006.01) |

(52) U.S. Cl.
CPC ....... *H01Q 15/16* (2013.01); *B29K 2105/167* (2013.01); *B29K 2507/04* (2013.01); *B29L 2011/0083* (2013.01); *B29L 2031/3067* (2013.01); *B29L 2031/3076* (2013.01); *B29L 2031/3097* (2013.01); *C08K 2201/001* (2013.01); *C08K 2201/011* (2013.01); *C08K 2201/014* (2013.01)

ARMCHAIR CHIRALITY

ZIGZAG CHIRALITY

SYSTEM AND METHOD FOR INFUSING NANO-TECHNOLOGY INTO PRODUCTION OF PHYSICAL STORAGE CONTAINERS

CROSS REFERENCE TO RELATED APPLICATIONS

This application is a continuation in part of U.S. patent application Ser. No. 17/572,061, filed Jan. 10, 2022, which is a continuation of U.S. patent application Ser. No. 17/180,476, filed Feb. 19, 2021, and issued as U.S. Pat. No. 11,258,183 on Feb. 22, 2022, which is a divisional of U.S. patent application Ser. No. 16/588,668, filed Sep. 30, 2019, and issued as U.S. Pat. No. 11,600,929 on Mar. 7, 2023, the contents of which are incorporated herein by reference.

BACKGROUND OF THE INVENTION

The present invention is directed to the production of shipping containers, computer server farm containers, and other forms of physical storage containers from a carbon nanotube-based fiber material with the potential application of other, non-carbon, nano-based materials containing various structures. Current materials used for shipping containers, computer server farm containers, and other forms of physical storage containers are heavier than the present invention and lack the ability to withstand high-intensity shock vibrations and other disturbances and are vulnerable to radiofrequency ("RF") radiation.

The present invention introduces the use of a carbon nanotube-based fiber material in the production of shipping containers, computer server farm containers, and other forms of physical storage containers of various shapes and sizes. The use of this material provides the ability for the containers to withstand high-intensity shock vibrations and other intense disturbances. Furthermore, the design of the material could be changed for various container designs. It is also possible to specifically energize certain nanoparticles within the material and/or product post-production (depending on the design and the materials used) as long as the nanoparticles are smaller than the membrane and the binding material. The present invention provides the novel ability to build a container with nano technology as well as use carbon nano material for shipping containers, computer server farm containers, and other forms of physical storage containers.

SUMMARY OF THE INVENTION

The present invention pertains to a system and method for the development and application of nano technology in the production of shipping containers, computer server farm containers, other forms of physical storage containers and other uses. In the primary embodiment of the present invention, the use of materials such as carbon nanotubes, nanoparticles, carbon nanofibers, and graphene/graphite powders can be used to develop a slurry that can be applied in the production of shipping containers, computer server farm containers, and other forms of physical storage containers as well as other artificial or biological membraned materials. In one embodiment of the present invention, the slurry can be used in the development of shipping containers, computer server farm containers, and other forms of physical storage containers. In this embodiment, the production process begins with carbon or other nano-based material. The nano-resonated structure is built into the nano matrix, to be used in the production of any of the shipping containers, computer server farm containers, and other forms of physical storage containers.

The present invention provides an alternative to the current preferred material (metal) for the development of shipping containers, computer server farm containers, and other forms of physical storage containers. Instead of using metal, which is the currently preferred material used in the development of shipping containers, computer server farm containers, and other forms of physical storage containers, one would use a carbon nanotube-based material. Unlike metal, which is easily disturbed by various environmental shocks and doesn't contain enough impact protection or elongation, the carbon nanotube-based fiber material can withstand intense shock and is invulnerable to RF radiation, electromagnetic radiation, solar radiation, solar flares, photonic energy, and acoustic energy. Shipping containers for transportation may be formed to be intermodal in nature. The shipping or transportation container may easily move across multiple transportation methods such as air, land, sea, space, or other forms of transportation. An intermodal container can be transported using multiple modes of transportation, without any handling of the freight itself when changing modes of transport.

In some embodiments, various layers of different fibers such as dyneema, Kevlar, and other fiber materials can be added to the slurry in order to create a bulletproof, explosion resistant and fragmentation proof material.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

Figure 1:
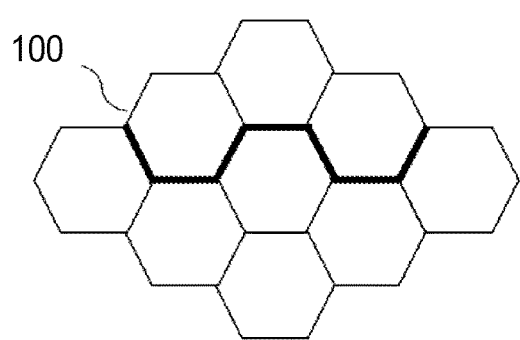
FIG. 1 shows the different chirality of the carbon nanotubes used in the material presented.
Figure 1:
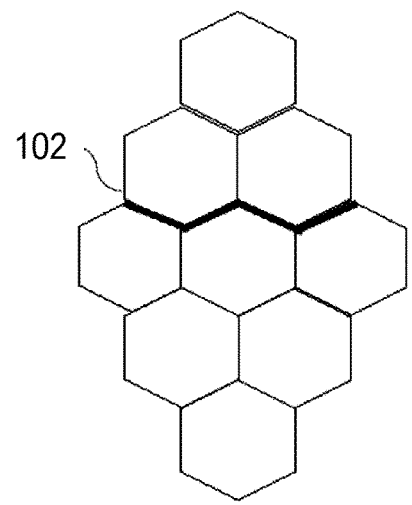

FIG. 1 is a diagram comparing the two chiral arrangements of the carbon nanotube structures in the chiral vector of the graphene layers of the material. The graphene layers of the material used for the antennas determine the electrical properties of the nanotubes. Chirality describes the angle of the nanotube's hexagonal carbon-atom lattice. These nanotubes can be in one of two chiral positions: armchair or zigzag. Accordingly, armchair nanotubes 100 have identical chiral indices and are highly desired for their conductivity. This is unlike the zigzag nanotubes 102, which may act as semiconductors. Turning a sheet of graphene as little as thirty degrees can change the nanotube it forms from armchair to zigzag chirality and vice versa.

Figure 2:
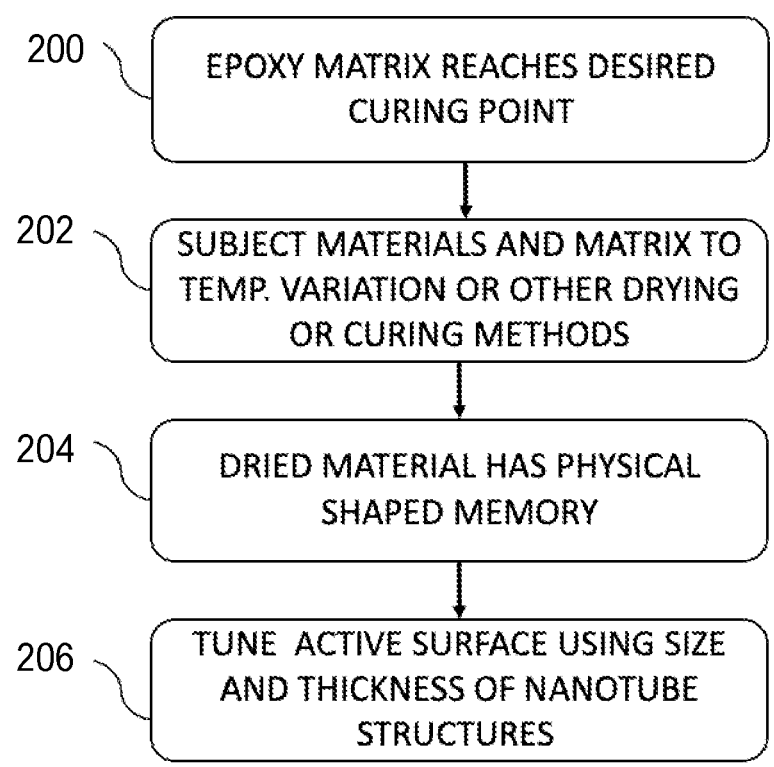
FIG. 2 is a flow diagram outlining the formation of the material used.

FIG. 2 is a flow diagram outlining several steps of the development of the material used for shipping containers, computer server farm containers, and other forms of physical storage containers. In accordance with the preferred embodiment, an epoxy matrix reaches the desired curing point 200. Once the desired curing point is reached, materials and matrix are subjected to a specific temperature for drying or other methods for drying or curing the material and matrix 202. Next, the dried material has physically shaped memory 204, and the active surface can be designed using size and thickness of the nanotube structures 206.

Shipping containers for transportation may be formed to be intermodal in nature. The shipping or transportation container may easily move across multiple transportation methods such as air, land, sea, space, or other forms of transportation. An intermodal container can be transported using multiple modes of transportation, without any handling of the freight itself when changing modes of transport.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A container having a monolithic structure of uniform reflectivity formed by a forming member wherein said structure includes:
    carbon nanotubes for reflecting radio frequency energy;
    carbon nanofiber for orienting along with said carbon nanotubes for enhancing said carbon nanotubes reflecting radio frequency energy;
    graphene-based powder for orienting along with said carbon nanotubes for enhancing said carbon nanotubes reflecting said radio frequency energy and for providing increased physical strength of said monolithic structure;
    resin for adhering to said carbon nanotubes, said carbon nanofiber and said graphene-based powder for further forming said monolithic structure of uniform reflectivity without encapsulation of said forming member;
    a resin hardener which reacts with said resin in order to form and lock into shape said monolithic structure of uniform reflectivity without encapsulation of said forming member within said container; and
    wherein said container is formed to be fixed in shape and rigid for reflection of said radio frequency energy, and wherein said container is formed as a homogeneous member and wherein said homogeneous member extends to exposed surfaces of said container, and wherein said radio frequency energy is reflected by said monolithic structure throughout its thickness.

2. The container of claim 1 wherein said carbon nanofibers adhere to said carbon nanotubes and said graphene-based powder to form a monolithic structure of uniform reflectivity without encapsulation of said forming member within said container.

3. The container of claim 1 wherein said monolithic structure is comprised of several concentrically interlinked carbon nanotubes.

4. The container of claim 1 wherein said carbon nanotubes are formed as armchair carbon nanotubes.

5. The container of claim 1 wherein said carbon nanotubes are formed as zigzag carbon nanotubes.

6. The container of claim 1 wherein said carbon nanotubes are single-walled.

7. The container of claim 1 wherein said carbon nanotubes are multi-walled.

8. The container of claim 1 wherein said container is chemically bonded with a substrate.

9. A container further formed from a slurry wherein said slurry is composed of carbon nanotubes and carbon nanofibers tuned to absorb electromagnetic signals and wherein said container is formed to be fixed in shape and rigid for reflection of said electromagnetic signals which are prevented from entering said container, and wherein said container is formed as a homogeneous member and wherein said homogeneous member extends to exposed surfaces of said container, and wherein said electromagnetic signals are reflected by said container throughout its thickness.

10. The container of claim 9 wherein said slurry further absorbs and discharges said electromagnetic signals.

11. The container of claim 9, wherein said slurry is composed of carbon nanotubes, carbon nanofibers, and graphene-based powder to form a uniformly dispersed reflective material without encapsulation of a forming member within said container.

12. A manufacturing process for forming a container having a monolithic structure of uniform reflectivity without encapsulation of a forming surface wherein forming said container includes the following steps:
   blending together carbon nanotubes, carbon nanofiber, and a resin hardener under suitable conditions to form a cured conductive slurry;
   applying said curing conductive slurry to a shaped forming surface wherein said shaped forming surface is of a shape corresponding to a parabolic reflecting surface;
   allowing said curing conductive slurry to harden; and
   separating said container from said shaped forming surface without encapsulating a support structure for operation as a container of uniform reflectivity without encapsulation of said forming surface and wherein said container is formed to be substantially rigid and fixed into place as a mirror image of said shaped forming surface, and wherein said conductive slurry hardens to form said monolithic structure of uniform reflectivity.

13. The manufacturing process for forming a container according to claim 12 wherein said container is formed by a brush application of said slurry onto said shaped forming surface.

14. The manufacturing process for forming a container according to claim 12 wherein said container is formed by a pour application of said slurry onto said shaped forming surface.

15. The manufacturing process for forming a container according to claim 12 wherein said container is formed by a spray application of said slurry onto said shaped forming surface.

16. The manufacturing process of claim 12 wherein said cured conductive slurry forms a homogenous container.

17. The manufacturing process of claim 12 wherein said cured conductive slurry possesses uniform levels of reflectivity through its cross-section and entire volume.

18. The container manufacturing process of claim 12 wherein said carbon nanofibers become oriented with said carbon nanotubes to form an organized matrix.

19. The container manufacturing process of claim 12 wherein said monolithic structure is comprised of several concentrically interlinked carbon nanotubes.

20. The container manufacturing process of claim 12 wherein said carbon nanotubes are formed as armchair carbon nanotubes.

21. The container manufacturing process of claim 12 wherein said carbon nanotubes are formed as zigzag carbon nanotubes.

22. The container manufacturing process of claim 12 wherein said carbon nanotubes are single-walled.

23. The container manufacturing process of claim 12 wherein said carbon nanotubes are multi-walled.

24. The container manufacturing process of claim 12 wherein said container is chemically bonded with a substrate.

25. A manufacturing process for forming a container having a monolithic structure of uniform reflectivity without encapsulation of a forming surface wherein forming said container includes the following steps:
   blending together carbon nanotubes, carbon nanofiber and a resin hardener under suitable conditions to form a cured conductive slurry;
   applying said curing conductive slurry to a shaped forming surface wherein said shaped forming surface is of a shape corresponding to a parabolic reflecting surface;
   allowing said curing conductive slurry to harden; and
   separating said container from said shaped forming surface without encapsulating a support structure for operation as a container of uniform reflectivity without encapsulation of said forming surface, wherein said carbon nanofibers became oriented with said carbon nanotubes to form an organized matrix, wherein said monolithic
   structure is comprised of several concentrically interlinked carbon nanotubes, and wherein said container is formed to be substantially rigid and fixed into place as a mirror image of said shaped forming surface, and wherein said conductive slurry hardens to form said monolithic structure of uniform reflectivity.

26. The manufacturing process for forming a container according to claim 25 wherein said container protects its contents from electromagnetic radiation.

27. The manufacturing process for forming a container according to claim 25 wherein said container protects its contents from acoustic energy.

28. The manufacturing process for forming a container according to claim 25 wherein said container protects its contents from photonic energy.

29. The manufacturing process for forming a container according to claim 25 wherein said container is formed for intermodal transportation.

30. The manufacturing process for forming a container according to claim 25 wherein said container is designed for aeronautical or spacecraft use.

* * * * *